United States Patent [19]

Rafferty

[11] Patent Number: 4,861,543
[45] Date of Patent: Aug. 29, 1989

[54] METHOD FOR THERMOFORMING MULTIPLE COVERSTOCK AND SUCH STOCK HAVING FINISHED STYLING LINES THEREIN

[75] Inventor: Scott Rafferty, Dover, N.H.
[73] Assignee: Davidson Textron Inc., Dover, N.H.
[21] Appl. No.: 158,618
[22] Filed: Feb. 22, 1988
[51] Int. Cl.$^4$ ............................................. B29C 65/18
[52] U.S. Cl. ................................. 264/545; 264/46.8; 264/553; 264/322; 264/510; 264/511
[58] Field of Search ............... 264/553, 545, 511, 546, 264/46.8, 320, 322, 324; 297/219, 229; 493/379, 393; 156/226

[56] References Cited

U.S. PATENT DOCUMENTS

| | | | |
|---|---|---|---|
| 3,042,974 | 7/1962 | Gerstenmaier et al. | 264/553 |
| 3,141,196 | 7/1964 | Langecker | 264/545 |
| 4,116,736 | 9/1978 | Sanson et al. | 264/545 |
| 4,738,809 | 4/1988 | Storch | 264/46.6 |

FOREIGN PATENT DOCUMENTS 49-038017 10/1974 Japan .................................. 264/545
53-144969 12/1978 Japan .................................. 264/553

Primary Examiner—Jan H. Silbaugh
Assistant Examiner—Allan R. Kuhns
Attorney, Agent, or Firm—John C. Evans

[57] ABSTRACT

A method for forming finished converstocks includes automatically heating and indexing slightly overlapped rough seams of coverstock segments with respect to a single thermoforming tool that automatically opens and closes to vacuum fold the rough seams interiorly of the tool and thereafter the folds are pinched to form a finished styling line on the class A surface of the coverstock. An apparatus is provided in which a single thermoforming tool has relatively moveable mold parts that shape the coverstock and include an expandable joint line configured to fold the rough seams and further including slide members responsive to closure of the mold parts to provide space to accommodate the fold for pinching it off with respect to the class A surface. The product of the invention includes multiple coverstocks with finished styling lines formed by pinched off folds on the hidden side of the coverstock.

5 Claims, 4 Drawing Sheets

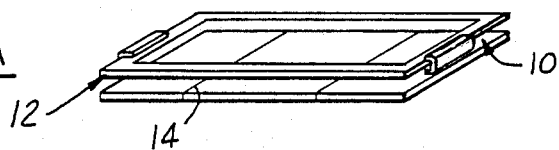
FIG IA
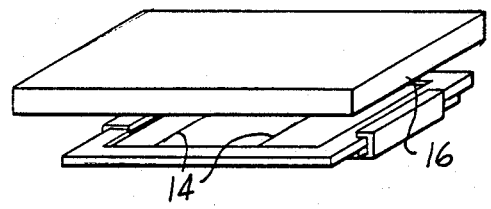
FIG IB
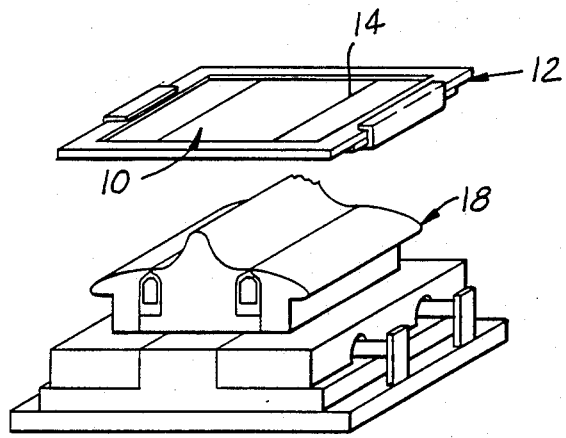
FIG IC
FIG ID
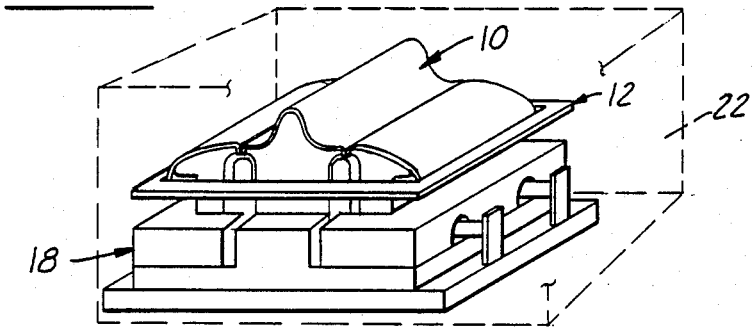

FIG IE
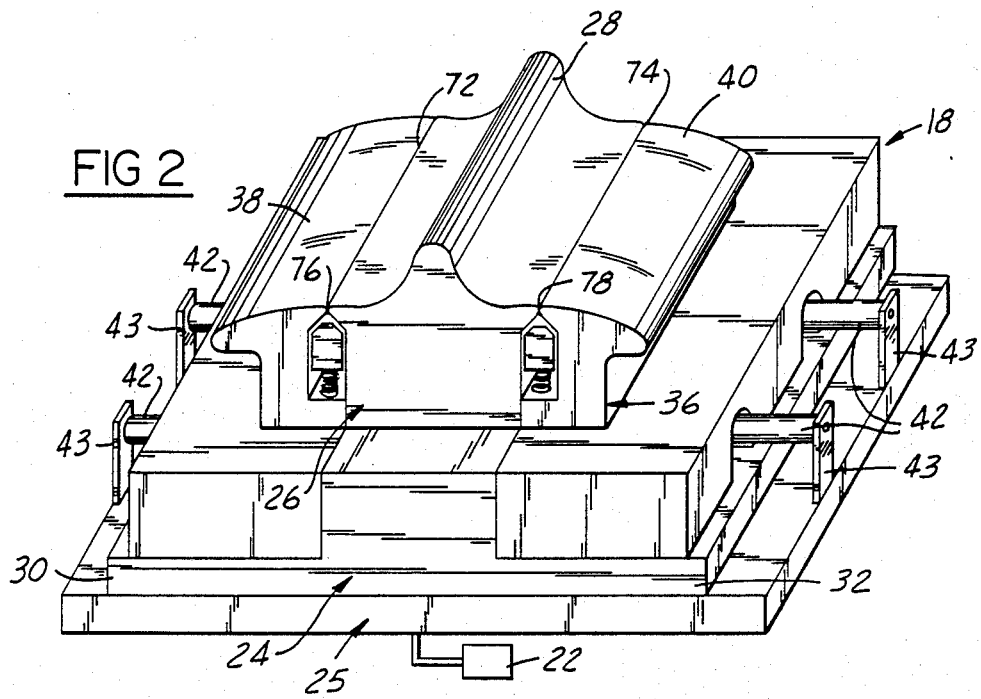
FIG 2
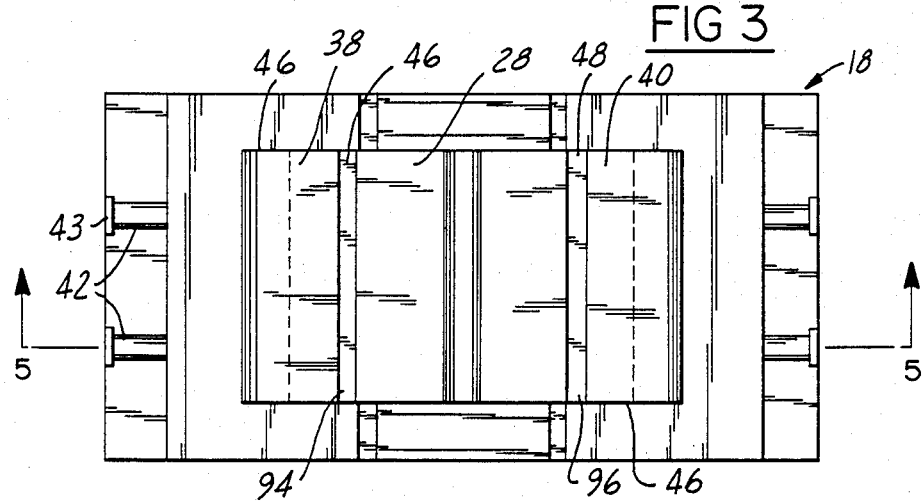
FIG 3

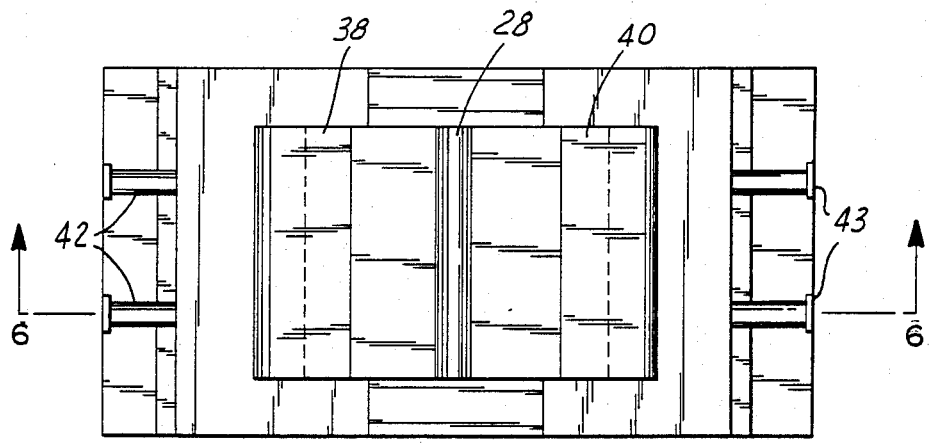
FIG 4
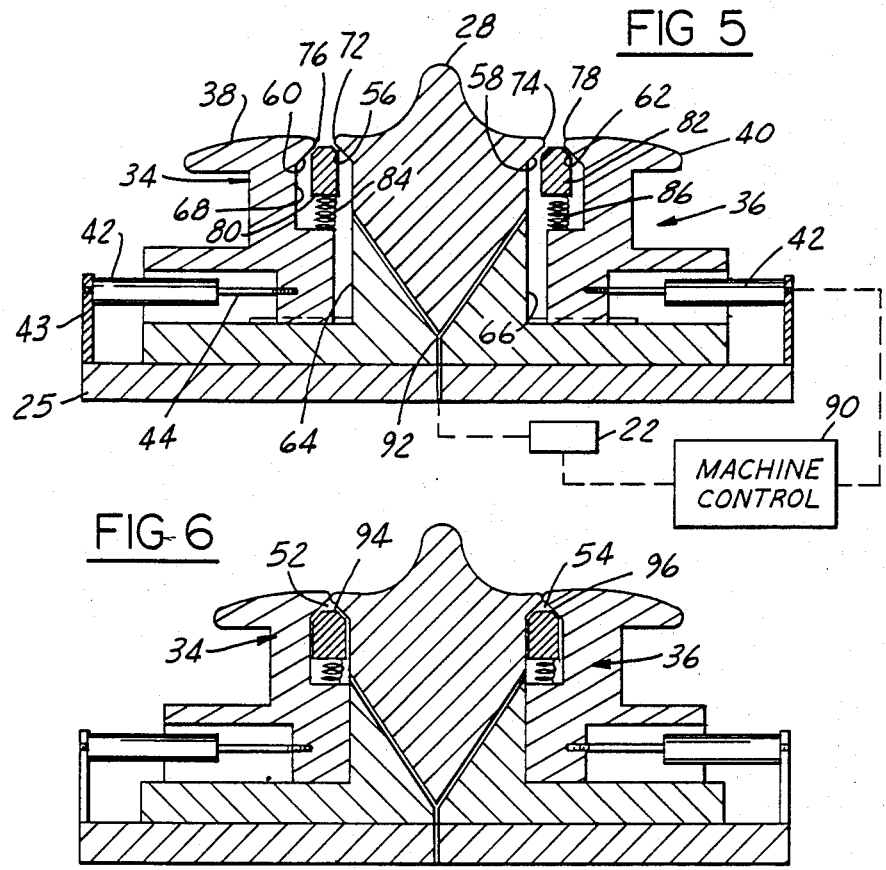
FIG 5
FIG 6

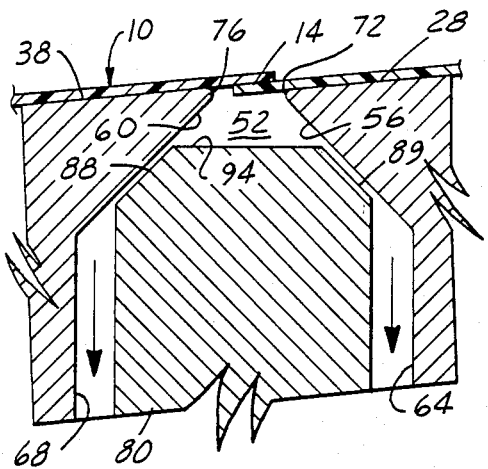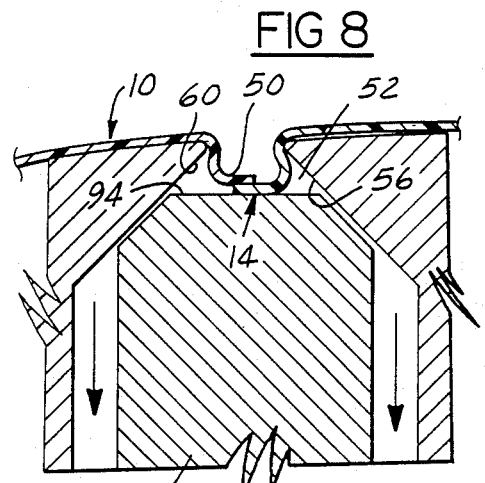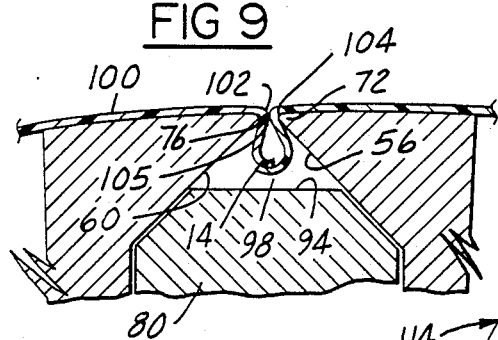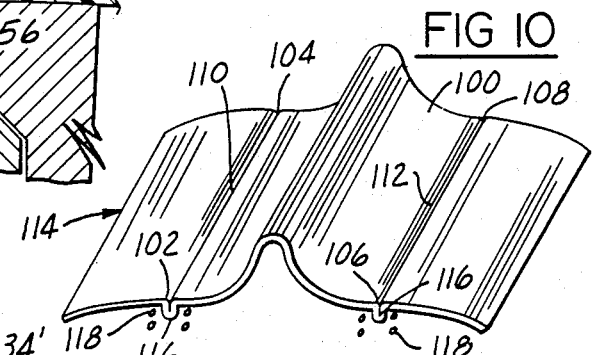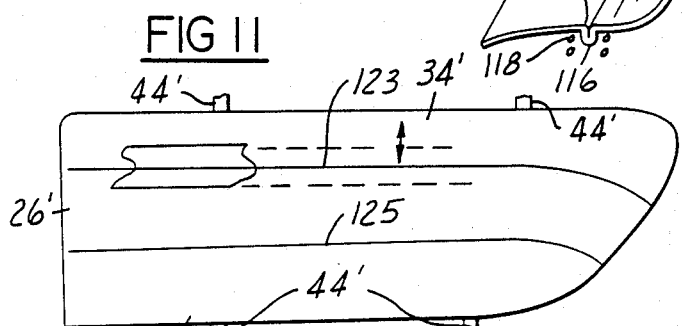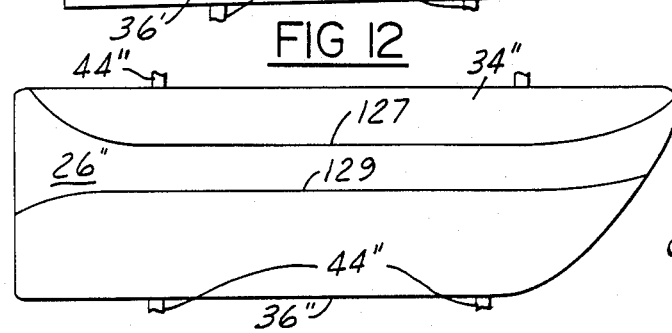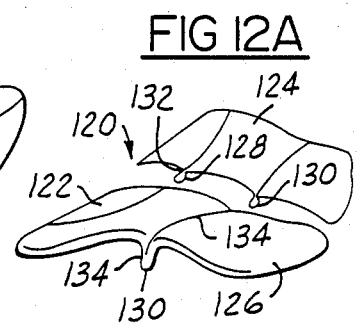

METHOD FOR THERMOFORMING MULTIPLE COVERSTOCK AND SUCH STOCK HAVING FINISHED STYLING LINES THEREIN

BACKGROUND OF THE INVENTION

This invention relates to a method and apparatus for manufacturing coverstocks for composite products and more particularly to multi-segment coverstocks and apparatus and methods for forming such multi-segment coverstocks.

DESCRIPTION OF PRIOR ART

It is known to thermoform coverstocks for composite plastic products such as PVC covered, foamed urethane parts such as used for vehicle interior trim parts.

While various types of multiple coverstocks have been used, a problem arises when the coverstock is formed from different segments of coverstock material, i.e., polyvinylchloride (PVC) material segments of different colors.

In the past such multiple coverstocks parts were made by layering coverstock segments on a base coverstock. Such layering of coverstock segments is labor intensive and also wastes the coverstock material which is covered by the added layers.

Another approach to providing multiple coverstocks is set-forth in U.S. Pat. No. 4,562,025 issued Dec. 31, 1985 and assigned to a common assignee. The multiple segments are formed by casting dry thermoplastic material against a heated mold and forming a fused joint between two different colors of cast material at a divider formed between the heated mold and a powder box supplying the castable material. While suitable for its intended purpose such a method may require that some of the cast material be wasted in the process.

It is also known to hand wrap and sew multiple coverstocks. While such a method conserves material it is extremely labor intensive.

It is also known to dielectrically bond the edges of multiple coverstocks to form a trim part cover. There is minimal waste but the method is labor intensive and is not applicable to forming coverstock for contoured parts such as contoured door panels for the interior of a vehicle.

The present invention obviates the material waste problem of certain of the prior methods and also lends itself to automated systems which eliminate labor in the formation of multiple coverstock product.

SUMMARY OF THE INVENTION

A feature of the method of the present invention is to automatically form styling lines in a multiple coverstock and to do so with little material waste and in a manner to reduce labor by the steps of joining coverstock segments at rough seams; heating and indexing the coverstock with respect to a single thermoforming tool; folding the rough seams interiorly of the single thermoforming tool inboard of an exposed finish surface thereon; and pinching the folds adjacent the exposed finish surface thereon to hide the rough seams while defining finished styling lines between the joined segments of the multiple segment coverstock.

Another feature of the method of the present invention is to form rough seams at common borders of multiple coverstocks and then automatically folding and pinching the rough seam so that it is hidden on the backside of a finished part while forming a finished styling line on the class A surface of the finished part.

Still another feature is to provide an improved thermoforming tool or shaping die for shaping and forming a multiple coverstock with finished styling lines thereon without wasting material and by automatic steps which reduce the labor required to make a finished part and to do so by a single mold tool with relatively moveable segments thereon that selectively open and close to capture, fold and pinch rough seams between the multiple coverstock segments to automatically conceal the rough seams while forming a finished styling line or lines on the exposed viewable class A surface of the finished coverstock.

An object of the present invention is to reduce the material content and the labor required to make multiple coverstocks and to do so by a method which lends itself to automation and to apparatus for making multiple coverstocks which includes a minimum of working parts.

Another object of the present invention is to provide a multiple coverstock which includes portions thereon which hide rough seams between the segments of the coverstock while defining smooth styling lines between the segments at the outer viewing surface thereof.

Other features, objects and advantages of the present invention will be apparent from the following descriptions and accompanying drawings of the preferred embodiments of the present invention.

BRIEF DESCRIPTION OF THE DRAWINGS

In the Drawings

FIGS. 1A-1D are diagrammatic views of the apparatus used in practicing the method of the present invention;

FIG. 1E is a chart of the method of the present invention;

FIG. 2 is a perspective view of a thermoforming tool or shaping die in accordance with the present invention;

FIG. 3 is a top elevational view of the tool in FIG. 2 shown in an open position;

FIG. 4 is a top elevational view of the tool in FIG. 2 shown in a closed position;

FIG. 5 is a sectional view taken along line 5—5 of FIG. 3 looking in the direction of the arrows;

FIG. 6 is a sectional view taken along line 6—6 of FIG. 4 looking in the direction of the arrows;

FIG. 7 is an enlarged fragmentary sectional view of a fold pocket formed in the tool when in its open position;

FIG. 8 is an enlarged fragmentary sectional view like FIG. 7 showing a rough seam folded into the fold pocket;

FIG. 9 is an enlarged fragmentary sectional view like FIG. 7 showing the tool and fold pocket in a closed position to pinch off the fold;

FIG. 10 is a perspective view of a finished multiple coverstock in accordance with the present invention;

FIGS. 11 and 12 are top elevational views of other embodiments of the apparatus of the present invention; and FIG. 12A is a perspective view of another embodiment of an inventive coverstock.

DESCRIPTION OF THE PREFERRED EMBODIMENTS

Referring to FIGS. 1A-1D, a method is illustrated in which a preformed multiple coverstock 10 is supported by a frame 12 FIG. 1A for precisely aligning rough seams 14 and the perimeter of the coverstock to the design of a composite part which includes the multiple coverstock as the covering surface thereof. Examples of such parts are urethane foam interior door panels which include a coverstock of PVC.

The frame 12 is indexed into an oven FIG. 1B which includes a suitable heater 16 for heating the multiple coverstock 10 to a suitable thermoforming temperature.

Once the material is heated the frame 12 is moved to position the coverstock 10 with respect to a single thermoforming tool or shaping die 18, as shown in FIG. 1C.

The frame 12 is positioned so that the heated multiple coverstock 10 is drape formed over the outer surface 20 of the thermoforming tool 18 as shown in FIG. 1D. The thermoforming tool or shaping die 18 is associated with a vacuum source 22 which is selectively evacuated when the tool or die 18 is opened to fold the rough seams 14 interiorly of the tool as shown in FIG. 1c. The tool is then closed to pinch the folds to hide the rough seams while concurrently forming a finished styling line on the finish coverstock shown in FIG. 10.

The method of the present invention includes the steps shown in the chart of FIG. 1E and includes heating and indexing a multiple coverstock with respect to a thermoforming shaping tool (FIGS. 1A–1C); shaping the coverstock over a shaping tool (FIG. 1D) by draping in the illustrated form; selectively folding rough seams of the coverstock into the shaping tool in the illustrated embodiment; and then using the shaping tool to pinch the fold to simultaneously hide the rough seam and to form a finished styling line on the visually exposed surface of the coverstock, in the mold in the illustrated embodiment. The pinch joint is cured and the finished part is then separated from the mold.

In the present invention apparatus for practicing the method is representatively shown as including a single thermoforming tool or shaping die 18 which is automatically operated to provide multiple coverstocks with minimal material waste and with automatically shaped styling lines.

More specifically the thermoforming tool or shaping die 18 includes a stationary mold 24 on a base 25. The mold 24 has a center segment 26 having a raised curved shaping surface 28.

The stationary mold 24 further includes a pair of lands 30, 32 which respectively slidably support a pair of moveable mold parts 34, 36. The mold parts 34, 36 respectively have curved shaping surface 38, 40. A drive cylinder 42 is connected to a brace 43 on the base 25. Each drive cylinder 42 has its piston rod 44 connected to one of the moveable mold parts 34, 36 to move them between open and closed positions with respect to the center segment 26. While a pair of drive cylinders 42 are shown on each side of the mold 24, it should be understood that a single drive cylinder centered with respect to the driven mold part or any other drive would be equally suitable.

Referring now to FIGS. 3 and 4 the surfaces 28, 38 and 40 combine to define a perimeter 46 which corresponds to the general outline of the multiple coverstock 10 which is carried by the frame 12 to index the rough seams 14 with respect to the thermoforming tool 18 and to move the coverstock 10 to drape it across the curved contours of the surfaces 28, 38 and 40. While curved shaping surfaces are illustrated it is also recognized that planar surface forms are equally suitable for use in thermoforming tools or shaping dies made in accordance with the invention.

Before the rough seamed coverstock 10 is draped on the thermoforming tool or shaping die 18, the moveable mold parts are located in an open position shown in FIG. 3. The frame 12 indexes the rough seams 14 to align with mold openings 46, 48 which follow the contour of the rough seams 14. The initial alignment of each of the seams 14 is shown in FIG. 7.

As the multiple coverstock 10 is draped over the thermoforming tool or shaping die 18 as shown in FIGS. 1D and FIG. 8 the vacuum source 22 applies vacuum and while the tool is still open the coverstock 10 has folds 50 inboard of the tool 18 as best seen in FIG. 8. Specifically, the vacuum is applied to fold pockets 52 formed interiorly of the thermoforming tool or shaping die 18.

The fold pockets 52, 54 are defined by inclined surfaces 56, 58 formed on opposite sides of the center segment 26 inboard of the shaping surface 28 and by opposed inclined surfaces 60, 62 formed on the moveable mold parts 34, 36. The inclined surfaces 56, 58, 60, 62 respectively extend from spaced, interiorly located, vertical surfaces 64, 66, 68, and 70 of the mold to rounded edges 72, 74, 76, and 78 on the exposed surface regions of the mold.

Slides 80, 82 are located in each of the fold pockets 52, 54. The slides 80, 82 are biased outwardly by springs 84, 86. Each of the slides 80, 82 have tapered surfaces 88, 89 which have the same inclination as surfaces 56–62 and which interact therewith to limit the spring biased position of the slides 80, 82 as the mold is automatically opened and closed by the drive cylinders 42. Also, the tapered surfaces 88, 89 will slide with respect to the inclined surfaces 56–62 as the mold is closed to force the slides 80, 82 inwardly to a clearance position shown in FIG. 9.

Operation of the thermoforming tool or shaping die 18 includes programming a suitable controller 90 to selectively actuate the drive cylinders 40, 42 and vacuum source 22 in the following sequence.

The tool 18 is opened as shown in FIGS. 3 and 5. The frame 12 is indexed and lowered with respect thereto. Vacuum is applied to the tool 18 as the multiple coverstock 10 is heated and draped over the shaping surfaces of the mold. The vacuum ports array will depend upon the design of the tool but for purposes of the illustrated tool includes passages 92 which communicate the vacuum source 22 with the fold pockets 52, 54.

Once the vacuum source 22 is activated, the rough seams 14 are drawn into the fold pockets 52 as shown in FIG. 8. The springs 84, 86 position the slides 80, 82 so that the upper end surfaces 94, 96 thereon will engage the rough seams 14 to form a fold which is representatively shown as a channel shape. The tapered surfaces 88, 89 have suitable relief passages formed therein to expose the full surface of the fold 50 to the vacuum source.

Once the fold 50 is shaped, the tool is closed as shown in FIGS. 6 and 9. Closure occurs when the controller 90 conditions the drive cylinders 42 to extend the piston rods 44 so as to shift the moveable mold parts 34, 36 toward the center segment 26. Such movement causes the inclined surfaces 54–60 to lower the slides 80, 82 against the springs 84, 86 which in turn forms a clearance space 98, shown in FIG. 9 for accommodating extra material drawn down by the rounded edges 72–78 as they contract against the fold 50. When the mold is closed the same rounded edges pinch the fold 50 between the rough seam 14 and the visually exposed surface (for purposes of this specification this surface will be referred to as the class A surface 100) to define a pinch line 105.

As shown in FIG. 10, the pinching action simultaneously forms spaced fillets 102, 104, 106, 108 which are tangent to the class A surface 100 and intersect the pinch line 105, thereby to define slightly inwardly recessed, precise styling lines 110, 112 which can be configured to any desired contour of finished multiple coverstock 114.

The vinyl material may be hot enough to seal the pinched joint 116. If not, a suitable dielectric heater 118 can be used to complete the seal at the pinched joint 116.

The mold 18 is unloaded by opening the mold 18 and indexing the frame 12 to a part unloading station.

Additional examples of tool configurations are shown in FIGS. 11 and 12. The fixed and moveable mold segments in the FIG. 11 embodiment are designated by like reference numerals as in the previously described embodiment primed. The fixed and moveable mold segments in the FIG. 12 embodiment are designated with like reference numerals double primed. In both cases, the mold segments are modified to have shapes which will conform to different styling line curvatures (FIG. 11, lines 123, 125 and FIG. 12, lines 127, 129).

Another multiple coverstock 120 in accordance with the present invention is shown in FIG. 12A as including three segments 122, 124, 126 having the rough seams 128, 130 therein hidden on the backside of the part 120 by pinched folds 132, 134. The segments are separated by precise styling lines 142, 144 which curve along the length of the coverstock to define the perimeter of the segments which can be of different color, texture, or other contrasting styling features.

It will be appreciated by those skilled in the art that the present invention is not limited to the precise embodiments of apparatus or products, or methods disclosed. For example the vacuum draw of the folds could be replace by pressure forming to force the coverstock rough edges into the fold pockets; the drive cylinders could be replaced by servo driven ballscrew drives; the thermoforming could be modified to include other forms of thermoforming such as contact heat and pressure forming; air slip forming and the like. While the coverstock is discussed as PVC material, a wide range of deformable sheet form or film materials both natural and synthetic would be equally suitable for use with the apparatus, methods or the product of the invention.

Various changes in the apparatus configuration, product shape and methods could also be made to meet the design objectives of form, fit and function attendant to a particular coverstock required for a particular composite product.

What is claimed is:

1. A method for forming a finished joint line between segments of a multiple coverstock comprising the steps of:

joining edge portions of the segments of the cover material to form a rough seam therebetween;

supporting the rough seam with respect to a shaping die having an expandable joint defined by moveable mold parts;

locating the moveable mold parts in an open position to expand the expandable joint;

applying a vacuum to the expanded joint of the shaping die to draw the rough seam inwardly of the shaping die while folding in the cover material at the rough seam to conceal the rough seam with respect to the remainder of the exposed surface of the cover material; and pinching the fold together to closely gather the cover material at the exposed surface thereof for forming finished styling lines therealong.

2. A method for thermoforming a multiple coverstock for use in the manufacture of foamed composition products in which multiple coverstocks are joined and shaped with respect to a thermoforming tool having an expandable joint, the improvement comprising:

joining coverstock segments at a rough seam;

heating the seamed multiple coverstock and indexably positioning the rough seam with respect to a single thermoforming tool having an expandable joint defined by moveable mold parts;

locating the moveable mold parts in an open position to expand the expandable joints;

applying a vacuum to the expanded joint of the single thermoforming tool to draw the rough seam interiorly of the thermoforming tool at the expanded joint thereof while folding in the multiple coverstock inboard of an exposed finish surface thereon; and pinching the fold adjacent the exposed finish surface thereon to define a precision styling line between the joined segments of the multiple segment coverstock.

3. In the method of claim 2, said drawing step including vacuum forming to conform the multiple coverstock to the shape of the single thermoform mold tool.

4. In the combination of claim 2, resiliently supporting the fold as it is drawn into the tool and removing the resilient support as the fold is pinched and for providing clearance for the fold as the precision styling line is formed.

5. In the combination of claim 3, resiliently supporting the fold as it is drawn into the tool and removing the resilient support as the fold is pinched and for providing clearance for the fold as the precision styling line is formed.

* * * * *